SENSE CIRCUITS EMPLOYING TUNNEL DIODES OR THE LIKE

Filed Aug. 15, 1962

INVENTORS
HARLEY A. CLOUD
PAUL B. FLAGG
WILLIAM K. MEAD
BY Paul D. Carmichael

TABLE OF CIRCUIT OPERATION
| ROW | SIGNAL FROM MEMORY REFERENCED TO TERMINAL 14 | INPUTS TO NODE 51 | | | |
|---|---|---|---|---|---|
| | | NODE 32 | NODE 33 | GATING SIGNAL AT TERMINAL 58 | OUTPUT SIGNAL AT TERMINAL 60 |
| 1 | 0 | − | − | + OR − | − |
| 2 | − | − | + | − | − |
| 3 | − | − | + | + | + |
| 4 | + | + | − | − | − |
| 5 | + | + | − | + | + |
FIG. 7
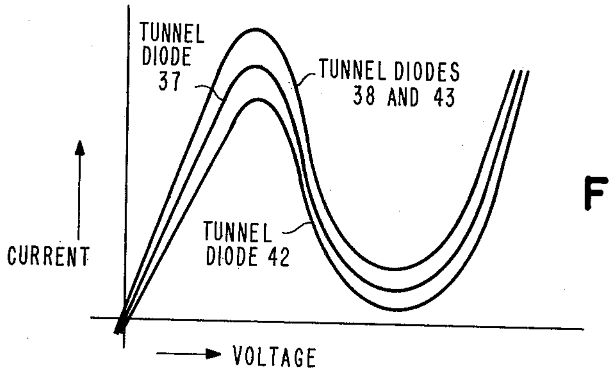
FIG. 9
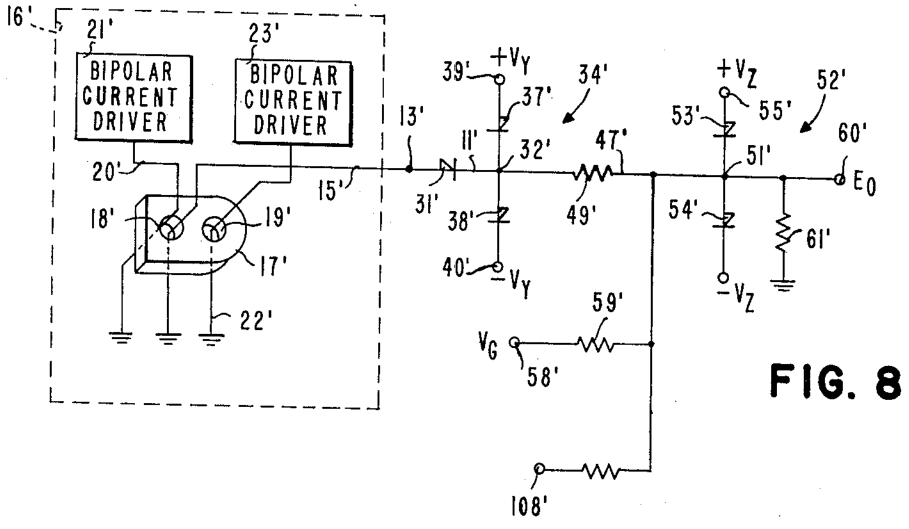
FIG. 8

United States Patent Office 3,156,833

Patented Nov. 10, 1964

3,156,833

SENSE CIRCUITS EMPLOYING TUNNEL DIODES OR THE LIKE

Harley A. Cloud, Vestal, and Paul B. Flagg and William K. Mead, Endicott, N.Y., assignors to International Business Machines Corporation, New York, N.Y., a corporation of New York Filed Aug. 15, 1962, Ser. No. 217,133

18 Claims. (Cl. 307—88.5)

The present invention relates generally to the electrical arts and more particularly to circuits for providing an indication of the level of an input signal.

In many applications, it is necessary to detect and provide an output indication of the level of an input signal. For example, in certain magnetic memory systems employed in digital data processors, the presence of one binary digit in a preselected storage location is indicated by bipolar or unipolar pulses. The other binary digit is represented by the absence of pulses or the presence of pulses of substantially reduced amplitude at the time of the memory reading operation. Means are required for sensing the binary digit stored in the preselected storage location at the memory reading time and for providing an electrical representation of the stored binary digit at the proper time to other portions of the digital data processor. Such means should be capable of operation at high rates of speed, reliable over long operating periods, relatively insensitive to environmental changes and able to discriminate against spurious signals.

The sense circuits described herein made use of a particular semiconductor device having a negative resistance region in its characteristic curve wherein a quantum mechanical tunneling principle is involved in providing the negative resistance region. Such a semiconductor device is known in the art as a tunnel diode in reference to the tunneling principle or an Esaki diode (see, for example, the article by L. Esaki entitled "New Phenomenon in Narrow Germanium p-n Junctions," Physical Review, Volume 109, pages 603 and 604, January 15, 1958). However, it should be understood at the outset, that the invention, in its broader aspects, is applicable to circuits employing other bistable or polystable devices and actuatable or settable in response to electrical stimulation.

A basic tunnel diode circuit well known in the art employs a pair of tunnel diodes connected in series as a "Goto pair" or "Twin-circuit." Clock pulse voltages are applied across the serially connected tunnel diodes. The polarity of the propagated signal will depend upon and is representative of the input signal or majority of the input signals supplied to the junction or node at the time of application of the clock pulse voltages. An illustrative article describing the design of tunnel diode twin circuits is entitled "Considerations in the Design of a Goto Logical System" by William K. Mead et al., IRE Transactions on Nuclear Science, Volume NS-9, pages 228–237, January 1962.

Briefly, the present invention relates to the provision of a sense circuit responsive to the level or amplitude of an input signal which comprises at least one pair of series connected and "mismatched" bistable circuit elements, such as tunnel diodes. The term "mismatched," as used in the present application, defines the condition where the bistable circuit elements are connected in a twin circuit or Goto pair arrangement and one of the circuit elements is effectively biased so that the node between the circuit element assumes a desired polarity in the absence of input signals when clock pulse signals are applied. In a preferred embodiment of the invention, the effective biasing is accomplished by providing tunnel diodes defining the twin circuit which have different characteristics, and particularly different peak currents. Input signals are coupled to and output signals are taken from the node between the circuit elements. Isolation means, preferably a tunnel diode connected between the source of input signals and the node, essentially isolates the source of input signals from the mismatched twin circuit after the application of an input signal whereby the drive capability of the sense circuit is greatly enhanced. Output means are coupled with the node so that an electrical signal corresponding to the sensed information is propagated to other logic circuitry at the appropriate time and is compatible therewith. In certain applications, such as where bipolar input pulses are being sensed or the input circuit is highly reactive and sensing occurs at a high rate, the sense circuit comprises a pair of the mismatched twin circuits or Goto pairs whose nodes are connected to the opposite terminals of the input source.

The primary or ultimate object of the present invention is to provide sense circuits employing tunnel diodes or the like which are capable of operating at high rates of speed, extremely versatile, characterized by their inherent ability to reject spurious signals, highly reliable and not adversely affected by environmental changes. Such circuits are ideally suited for use as sense circuits with magnetic memory systems in digital data processors. Further, the circuits lend themselves to advanced microminiature packaging techniques whereby rugged structure is provided.

Another object of the invention is to provide a sense circuit employing a pair or pairs of mismatched tunnel diodes or the like. The degree of mismatch between the tunnel diodes determines the threshold level of the input signal necessary to cause a change in the output signal and the inherent ability of the sense circuit to reject spurious signals.

Yet another object of the invention is to provide a sense circuit employing tunnel diodes or the like having means for effectively isolating the input circuit from the sense circuit. This isolation is preferably provided by one or more tunnel diodes and greatly enhances the driving capability of the sense circuit, as will be hereinafter more fully described.

A further object of the invention is the provision of a sense circuit which is particularly adapted for use with a magnetic memory system in sensing and providing an indication of the binary representation stored in a preselected storage location within the memory system. The sense circuit is employed for sensing bipolar or unipolar input signals supplied by a magnetic memory system as is required in any particular application. An output signal corresponding to the information in the input signal is supplied to other logic circuits of the digital data processor at the appropriate time and is compatible therewith.

The foregoing and other objects, features and advantages of the invention will be apparent from the following more particular description of preferred embodiments of the invention as illustrated in the accompanying drawings.

In the drawings:

FIGURE 7 is a table showing the polarities of the output signals from the sense circuit of FIGURE 1 for various combinations of input and gating signals applied thereto;

FIGURE 8 shows superimposed characteristic curves of tunnel diodes employed in a modification of the circuit of FIGURE 1; and FIGURE 9 is a schematic circuit diagram of another sense circuit embodying the teachings of this invention which may be used in sensing unipolar input signals.

Figure 1:
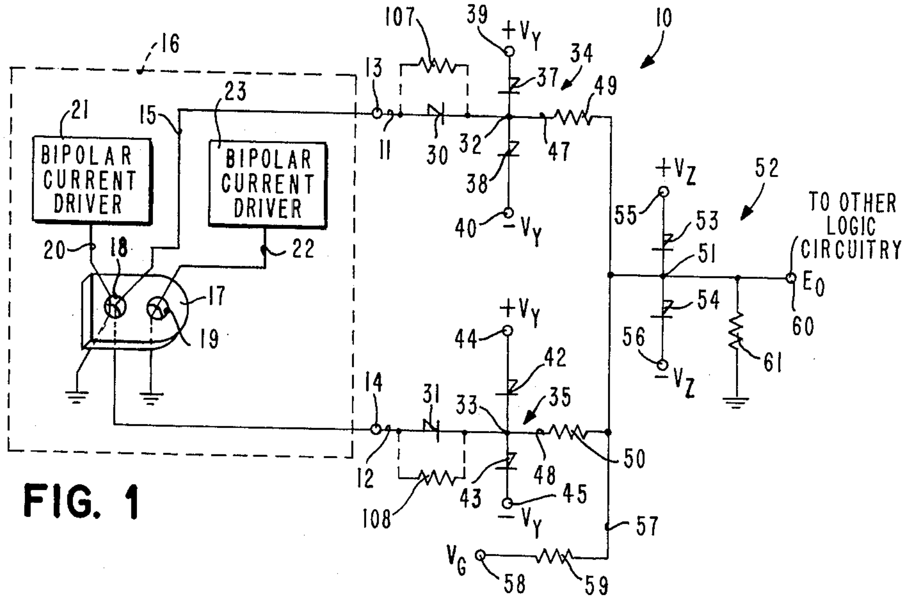
FIGURE 1 is a schematic circuit of a sense circuit employing tunnel diodes constructed in accordance with the teachings of the present invention.

Referring now to the drawings, and initially to FIGURES 1–7 thereof, the reference numeral 10 designates generally a sense circuit embodying the teachings of this invention. The sense circuit 10 has its input conductors 11 and 12 connected with the output terminals 13 and 14 of a sense winding 15 leading from a magnetic memory system 16. The magnetic memory system 16 is represented by a single memory element or core 17 of magnetic material having two apertures 18 and 19 therein of equal diameter. The aperture 18 is usually called the read aperture and the sense winding 15 passes therethrough. In addition, a read winding 20 is threaded through the read aperture 18 and is connected with a bipolar current driver 21 which supplies bipolar read pulses thereto. Passing through the remaining aperture 19, or control aperture, is a control winding 22 that is connected with a bipolar current driver 23.

As is well known in the art, the magnetic core 17 defines a bistable storage element for storing binary information. The binary information stored within the core is defined by whether or not transformer action or coupling exists between the sense winding 15 and the read winding 20. The magnetic state of the storage element, representing the stored binary information, is controlled by the proper application of bipolar read and control pulses over read and control windings 20 and 22. It is sufficient for the present description to understand that when transformer coupling does exist between the sense and read windings 15 and 20 and a bipolar read pulse is applied to the read winding, bipolar pulses 25 and 26 (see FIGURE 2) of considerable amplitude will appear on the sense winding 15. This condition will be assumed to represent the storage of a binary one in the memory element. When there is no, or very little, transformer coupling between the read and sense windings 15 and 20, there will be no output signals or very low level output pulses 27 and 28 (see FIGURE 2) on the sense winding when bipolar read pulses are applied to read winding. This condition represents the other binary state or zero.

It should be understood at the outset that no claim is made to a magnetic memory element or system other than in the combinations hereinafter disclosed. The sense circuits of this invention are adapted to be used with any magnetic memory system wherein the presence and/or absence of pulse outputs represent the two binary states. For those desiring a more detailed description of the operation of the representative magnetic memory element disclosed herein, reference is made to U.S. patent application Serial No. 823,525, entitled "Magnetic Devices," filed June 29, 1959, and assigned to the assignee of the present invention.

As is well known in the art, a magnetic memory system usually comprises a great number of the magnetic cores 17 or the like arranged in a matrix. The read winding 20 may be replaced by a pair of "X" and "Y" address conductors to permit coincident selection of a desired core or storage location. A typical systems application employing a large number of the magnetic cores 17 is described in U.S. patent application Serial No. 79,722, entitled "Magnetic Memory System," filed December 30, 1960, and assigned to the assignee of the present invention. Thus, while only one core 17 is shown in FIGURE 1 of the drawings, the sense winding 15 may in fact pass through the read apertures of a very large number of cores.

The input conductors 11 and 12 of the sense circuit 10 each have a tunnel diode 30 or 31 disposed therein for purposes of isolation as will be hereinafter more fully explained. The anodes of the tunnel diodes 30 and 31 are connected to junctions or nodes 32 and 33 of a pair of mismatched twin circuits or Goto pairs 34 and 35, respectively. The twin circuit 34 comprises series related diodes 37 and 38 which are connected between clock pulse voltage terminals 39 and 40. Similarly, the mismatched twin circuit 35 is defined by tunnel diodes 42 and 43 connected in series between clock pulse voltage terminals 44 and 45.

Output signals are taken from the mismatched twin circuits 34 and 35 over conductors 47 and 48 having resistors 49 and 50 disposed therein. The conductors 47 and 48 supply inputs to node 51 of a twin circuit 52 comprising matched tunnel diodes 53 and 54 connected in series between clock pulse voltage terminals 55 and 56. The remaining and third input to node 51 is provided by conductor 57 which leads to gating input terminal 58 and has resistor 59 disposed therein. Output signals ($E_o$) are taken from the sense circuit at output terminal 60 which is connected with node 51. A load resistor 61 has one end terminal referenced to ground and the other end terminal thereof connected between node 51 and output terminal 60. The twin circuit 52 defines an output means for transferring the sensed information in compatible form and at the proper time to other logic circuitry of a digital data processor.

Figure 3:
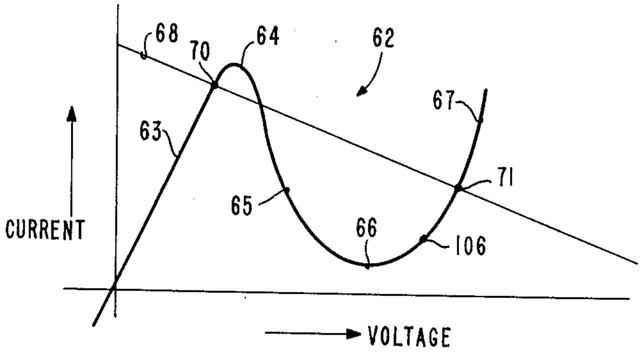
FIGURE 3 is a graph of current versus voltage depicting the characteristics of a typical tunnel diode.

In FIGURE 3 of the drawings, the curve 62 represents the voltage-current characteristic of a tunnel diode. This curve includes a positive resistance region 63 rising through the origin to point 64 representing the peak current and voltage, a negative resistance region 65 extending between point 64 and valley area 66 and a positive resistance region 67 to the right of the valley area 66. A load line 68 is also shown which intersects the curve 62 at points 70 and 71 in the positive resistance regions 63 and 67 thereof. If the operating point of the tunnel diode is initially at the origin and the voltage or current is increased until the peak voltage or current as defined by point 64 is exceeded, the operating point of the tunnel diode will switch through negative resistance region 65 to stable operating point 71. If the current or voltage is then reduced so that the operating point falls into the valley area 66, the operating point will switch back through negative resistance region 65 to stable operating point 70. The load line 68 also crosses the negative resistance region 65 but this intersection is unstable so that a tunnel diode biased as indicated has two stable operating points or states.

As mentioned above, the sense circuit of FIGURE 1 of the drawings, comprises a pair of mismatched twin circuits or Goto pairs comprising the tunnel diodes 37–38 and 42–43. For purposes of discussion, it will be assumed that the pairs 37, 42 and 38, 43 of the tunnel diodes are identical and only one of the mismatched twin circuits will be described in detail. Superimposed voltage-current characteristics of the tunnel diodes 37 and 38 are depicted by curves 75 and 76 in FIGURE 4 of the drawings. These characteristic curves are generally the same with the exception that peak current value 77 of diode 38 is substantially greater than the peak current value 78 associated with tunnel diode 37. The tunnel diodes 37 and 38 are mismatched in the sense that the peak currents are not the same. A load line 79 is shown superimposed on the characteristic curves 75 and 76 and it is noted that tunnel diode 37 has two stable operating points 80 and 81 while operating points 82 and 83 define the stable states of tunnel diode 38. The arrangement is such that, if the current is increased to a value above peak current 78 but below peak current 77, the operating point of tunnel diode 37 will switch to point 81. However, since the peak current of tunnel diode 38 has not been exceeded, this tunnel diode will remain in its initial stable state as represented by operating point 82.

The terminals 39 and 44 of the mismatched twin circuits 34 and 35 are connected with a source of positive clock voltage Vy while the terminals 40 and 45 receive negative clock voltage —Vy from a suitable source thereof. As shown by idealized waveform 86 in FIGURE 2 of the drawings, the clock voltage Vy is a series of positive pulses which rise from ground or the zero potential level to the Vy level. The negative clock voltage —Vy (waveform 87) is the mirror image of waveform 86 in that the negative pulses have an amplitude of —Vy below ground or the zero potential level. The magnitude of the clock pulse voltages Vy and —Vy is given by the following equation:

$$Vy=\frac{V_1+V_2}{2}$$

Where:

$V_1$=voltage of low voltage state (point 82) of tunnel diode 38.

$V_2$=voltage of high voltage state (point 81) of tunnel diode 37.

Assuming that no input signal from the magnetic memory system is present at terminals 13 and 14, the nodes 32 and 33 of mismatched twin circuits 34 and 35 will both be negative during the application of clock pulses Vy and —Vy to terminals 39–40 and 44–45. The clock pulses Vy and —Vy will cause the operating points of tunnel diodes 37 and 38 to rise from the origin along the positive resistance regions of characteristic curves 75 and 76 (see FIGURE 4) until the peak current 78 of tunnel diode 37 is exceeded. The tunnel diode 37 will switch to its high voltage state 81 while the operating point of tunnel diode 38 will be at stable operating point 82. The voltage at the node 32 at this time will be equal to the positive clock voltage (Vy) minus the voltage $V_2$. The magnitude of voltage $V_2$ is greater than that of the positive clock voltage Vy so that node 32 will have a negative polarity due, in essence, to the mismatch of the peak currents of tunnel diodes 37 and 38. In a similar manner, the tunnel diode 42 switches to its high voltage state and tunnel diode 43 is in its low voltage state after application of clock voltage pulses Vy and —Vy whereby node 33 assumes a negative polarity. One particularly important aspect of this invention is that, under the conditions outlined above with matched circuits 34 and 35, no current flows in the input circuit. Thus, the impedance characteristics of the input circuit do not effect in any manner the quiescent operation of the sense circuit.

Figure 2:
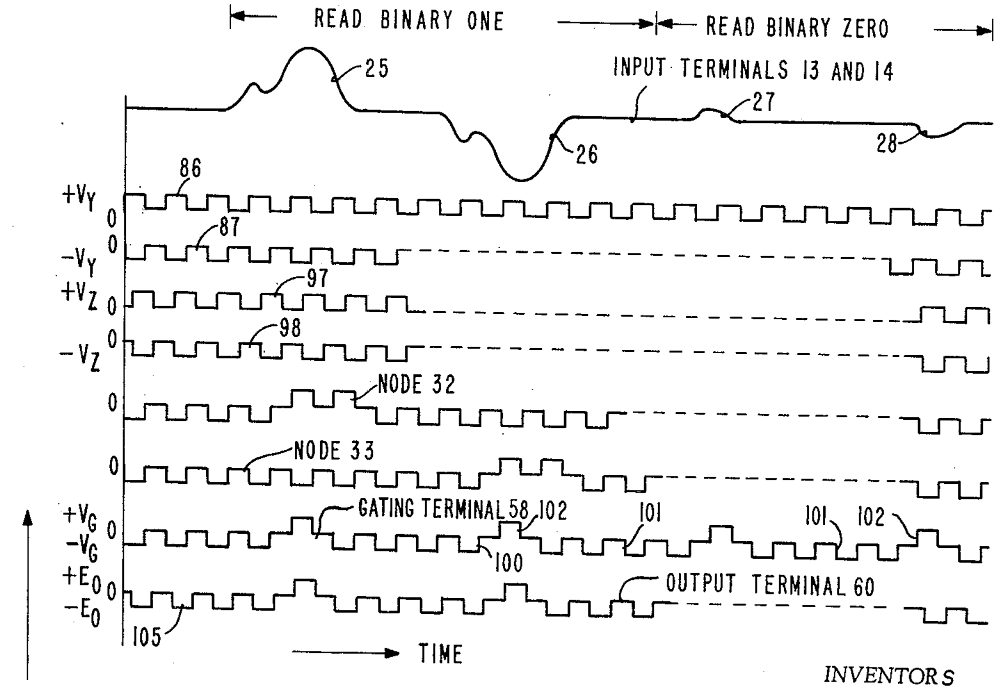
FIGURE 2 illustrates a series of waveforms with respect to time appearing at various points in the sense circuit of FIGURE 1.

The effect of bipolar input pulses supplied from the magnetic memory system 16 on the mismatched twin circuits or Goto pairs 34 and 35 in the absence of clock voltage pulses will now be considered. As shown in FIGURE 2 of the drawings, the memory provides bipolar analog input signals 25 and 26 which represent a binary one stored in core 17. The clock pulse terminals 39–40 and 44–45 of the mismatched twin circuits are at ground or the zero potential level as is shown in the equivalent circuits of FIGURES 5 and 6 of the drawings.

Figure 4:
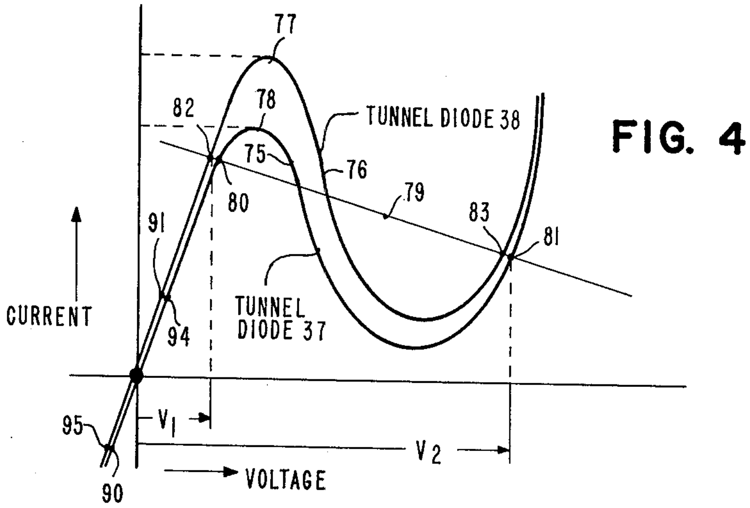
FIGURE 4 is a graphical superposition of the voltage-current characteristics of two tunnel diodes employed in one of the mismatched twin circuits or Goto pairs used in the circuit of FIGURE 1.
Figure 5:
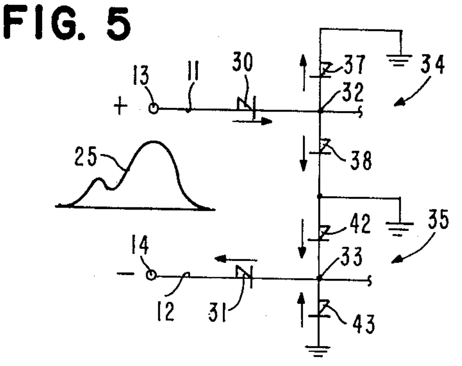
FIGURES 5 and 6 are equivalent schematic circuits of the sense circuit of FIGURE 1 showing current flow for positive and negative input signals, respectively, in the absence of clock pulse voltages.

When a positive input pulse 25 is supplied from the magnetic memory system 16, the terminal 13 is at a positive voltage value with respect to input terminal 14 and steering current flows as indicated by the arrows in FIGURE 5 of the drawings. The tunnel diode 37 is back biased so that its operating point is shifted below the origin as is represented by point 90 on its characteristic curve (see FIGURE 4). However, the tunnel diode 38 is forward biased whereby its operating point, prior to the application of clock pulse voltages, is shifted up its characteristic curve to point 91. The arrangement is such that the application of clock pulses to the terminals 39 and 40 will cause tunnel diode 38 to switch to its high voltage state (point 83) while the tunnel diode 37 will operate at its low voltage state (point 80). Thus, the node 32 will assume a positive polarity under these conditions.

The input or steering current will forward bias the tunnel diode 42 having the lower peak current of the tunnel diodes 42 and 43 comprising the mismatched twin circuit 35 when a positive analog input signal 25 is present. The operating point of tunnel diode 43 will fall below the origin on its characteristic curve. In this manner, the node 33 will assume a negative polarity when the clock pulse voltages go to the Vy and —Vy levels in the presence of a positive input signal 25. With a positive input signal at terminals 13 and 14 and when the clock voltages 86 and 87 are applied, the node 32 is positive and the node 33 is negative.

Figure 6:
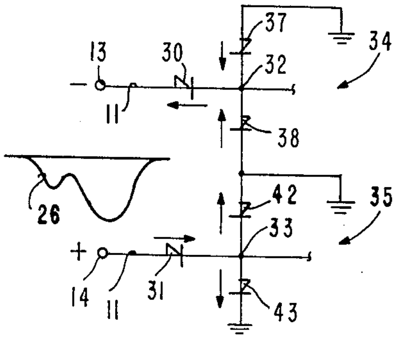

Input or steering current flow upon the application of a negative analog input signal 26 from magnetic memory system 16 to terminals 13 and 14 is depicted in FIGURE 6 of the drawings. The tunnel diode 37 is forward biased whereby its operating point shifts upwardly along the positive resistance region of its characteristic curve to point 94 as shown in FIGURE 4 of the drawings. The current flowing in tunnel diode 38 causes the operating point thereof to shift below the origin to point 95. Thus, node 32 of mismatched twin circuit 34 will assume a negative polarity when the clock voltage pulses are applied. Node 33 of mismatched twin circuit 35 will be at a positive polarity under these same conditions since tunnel diode 43, which has the higher peak current, will switch to its high voltage state and tunnel diode 42 will remain in its low voltage state.

From the above discussion, it should now be apparent that when no input signal from the magnetic memory system is present, the nodes 32 and 33 will both be negative. The pulses 27 and 28, which may occur during the reading operation when a binary zero is stored in the core 17, are not of sufficient amplitude to cause one of the nodes 32 and 33 to assume a positive polarity when the clock pulse voltages are applied. Alternately, when a positive input signal 25 representing a binary one is applied, the node 32 will be positive and node 33 will be negative. The application of a negative pulse representing a binary one stored in core 17 causes node 33 to be positive and node 32 to be negative.

The outputs from the mismatched twin circuits 34 and 35 serve as two inputs to matched twin circuit 52 comprising tunnel diodes 53 and 54. These tunnel diodes are matched, i.e., their peak currents are approximately the same, and clock pulse voltages Vz and —Vz are supplied to terminals 55 and 56. As shown in FIGURE 2 of the drawings, the clock voltages Vz and —Vz are trains of positive and negative pulses represented by idealized waveforms 97 and 98. The Vz and —Vz clock voltages occur in sequential and overlapping relation with respect to clock voltages Vy and —Vy in that the wave fronts of the pulses Vz and —Vz occur after the wave fronts of the pulses Vy and —Vy and the pulses are partially overlapped. This arrangement allows the information from the magnetic memory system sensed by mismatched twin circuits 34 and 35 to be propagated to twin circuit 52 and then to other logic circuitry of the digital data processor.

Since, as mentioned above, the tunnel diodes 53 and 54 are matched, the polarity of the signal at the node 51 will be determined by the algebraic sum of the input or steering currents to the node when the clock pulse voltages Vz and —Vz are applied. The node 51 assumes the same polarity as the majority of the input signals coming from the mismatched twin circuits 34 and 35 and the gating input terminal 58. This type of circuit is often referred to as a majority logic element because of this feature. A more complete description of the operation of such a circuit is contained in U.S. patent application Serial No. 206,770, entitled "Clock Pulse Generation and Distribution Circuit," filed July 2, 1962, which is assigned to the assignee of the present invention.

The terminal 58 has a gating signal $V_g$ applied thereto which is represented by waveform 100 in FIGURE 2 of the drawings. The gating signal is a pulse train comprising series of negative pulses 101 separated by positive pulses 102. The positive pulses 102 occur at the time during a reading operation when it is desired to transfer the information coming from the magnetic memory system 16 to other logic circuitry of the digital data processor.

The over-all operation of the sense circuit is perhaps best understood by reference to the table shown in FIGURE 7 of the drawings. The output signal at terminal 60 (represented by waveform 105 in FIGURE 2 of the drawings) has the same polarity as the majority of the polarities of the input signals supplied to node 51 of matched twin circuit 52. When there is no input signal from the memory, the nodes 32 and 33 will be negative and the output signal 105 will be negative regardless of the polarity of the gating signal as is represented by row one of the table. The output signal will also be negative when an input signal (whether positive or negative) is applied and the gating signal is negative as shown in rows two and four. Rows three and five indicate the output signal will have a positive polarity representing that a binary one is stored in core 17 only when one of the nodes 32 or 33 is positive due to the presence of an input signal (whether positive or negative) and the gating signal is positive.

As mentioned above, the tunnel diodes 30 and 31 connected in series between input terminals 11, 14 and nodes 32, 33, respectively, and in back-to-back relation to each other, perform an important isolation function. Since the input signals are applied to and output signals are taken from the same node for each of the mismatched twin circuits 34 and 35, the portion of the load current from each of the circuits 34 and 35 available for driving or steering the twin circuit 51 is equal to the total load current available (defined as the difference in current operating points of the tunnel diode pairs 37, 38 or 42, 43) minus the current required by the flowing in the input circuit. When the nodes 32 and 33 have the same polarity and are at the same potential level, none of the available load current from either of the mismatched twin circuits 34 and 35 flows in the input circuit. However, when one of the nodes assumes a positive polarity and the other node assumes a negative polarity, a current will flow from the positive node, through the input circuit, to the negative node and to ground. This current is not available for driving the circuit 52 and the over-all drive capability of the sense circuit is seriously degraded. The amount of degradation will, of course, depend on the impedance characteristics of the input circuit. However, it is noted that when the nodes 32 and 33 assume opposite polarities, the input circuit presents approximately twice the load to each node as compared to the situation where each of the nodes were grounded through the input circuit rather than the other of the mismatched twin circuits.

If it is assumed that a positive input signal from the magnetic memory system is present at the time the clock pulse voltages $V_y$ and $-V_y$ are applied, node 32 will assume a positive polarity and node 33 will assume a negative polarity. The potential applied across tunnel diode 30 will cause the operating point of the same to rise above its peak and switch through its negative resistance region to a high voltage-low current state as represented by point 106 on the characteristic curve of FIGURE 3, for example. The tunnel diode 30 now appears as a high impedance device and substantially reduces the amount of current flowing in the input path. The switching of the tunnel diode 30 is operative to isolate the input circuit from the sense circuit after the application of the clock pulse voltages. The tunnel diode 31 will remain in its low voltage state at this time since the same is back biased by the current in the input path. When node 33 assumes a positive polarity and node 32 a negative polarity upon application of a negative input signal from core 17 and the clock voltages $V_y$ and $-V_y$, the tunnel diode 31 switches to its high voltage state to define a relatively high impedance for effectively isolating the input circuit and sense circuit. The tunnel diode 30 is maintained in its low voltage state under these conditions. The tunnel diodes 30 and 31 are selected so that operating points of the tunnel diodes in the second positive resistance regions of their characteristic curves are in or immediately to the right of the valley areas. Under these conditions, the switched one of the tunnel diodes will present the maximum impedance for effectively isolating the input circuit from the sense circuit.

The requirement for isolation between the input and sense circuits will depend primarily upon the particular application and the characteristics of the input circuit. If isolation is not necessary, the tunnel diodes 30 and 31 may be replaced with resistors 107 and 108 as shown in FIGURE 1 of the drawings.

The use of the above disclosed sense circuit in combination with a magnetic memory system offers many advantages. The sense circuit provides a means for converting from the memory speed and signal levels to the logic circuitry speed or rate and signal levels. In the digital data processor, the memory timing is synchronized with the timing for the logic circuitry in order to insure proper addressing and reading operations. Thus, the gating signal 100 is referenced to both the memory and logic timing so that the sense circuit is interrogated only when information from the magnetic memory system is present and the peaks of the analog input signals occur assuming, of course, that the sense circuit is operating at a rate equal to or greater than the speed of the magnetic memory system. The ability to read on both positive and negative pulses compensates to some extent for the relatively slow speed of the magnetic memory system as compared to the speed of operation of the logic circuitry. The sense circuit is operated at the rate of the logic circuitry and the clock pulse voltages $V_y$, $-V_y$, $V_z$ and $-V_z$ are preferably the clock signals associated with the other logical circuitry of the digital data processor whereby separate clock pulse sources are not required for the sense circuit.

The sense circuit is directly connected to the sense winding 15 of the magnetic memory system without intermediate preamplification stages or transformer coupling in the disclosed embodiment of the invention. This results in substantial cost and circuit savings, as should be apparent. However, preamplification stages may be inserted between the sense circuit and the sense winding if this is required or desired in any given application. The use of a preamplifier would possibly allow some relaxation of the amplitude tolerances on the sense signals of the magnetic memory system. The amount of percentage of mismatch of the peak currents of the tunnel diodes 37, 38 and 42, 43 in circuits 34 and 35 is directly related to the drive capability of the input circuit. For example, in a constructed embodiment of the circuit shown in FIGURE 1 of the drawings, the pairs 37, 38 and 42, 43 of tunnel diodes each had peak currents which were mismatched by approximately four percent of the maximum peak currents. An input signal or steering current in excess of four percent of the maximum peak currents was required to cause one of the nodes 32 and 33 to assume a positive polarity when the clock pulse voltages were applied.

The sense circuit is characterized by its ability to discriminate against spurious signals. When the clock pulses are applied, the percentage mismatch between the peak currents of the tunnel diode pairs 37, 38 and 42, 43 defines the inherent discriminating ability of mismatched twin circuits 34 and 35. The noise signal must exceed the percentage mismatch of the tunnel diode pairs before the circuits 34 and 35 will assume opposite polarities. However, the terminal operation of the sense circuit will not be effected unless a noise signal of sufficient amplitude occurs during a reading time when the gating signal V*g* is at the positive voltage level. At all other times, the majority of the inputs to circuit 52 will be negative. It is noted that if a noise signal occurs when the clock terminals for mismatched twin circuits 34 and 35 are at ground, the same must have a much greater amplitude before the nodes of these circuits assume different polarities.

Certain modifications may be made in the circuit of FIGURE 1 without departing from the teachings of this invention. For example, the clock pulse voltage terminals 34, 40 and 44, 45 can be grounded where the input signal has sufficient power to drive the mismatched circuits by itself. The over-all operation of the mismatched twin circuits remains the same to the extent that once the threshold levels thereof have been exceeded, the nodes will assume opposite polarities. In the above discussion, it was assumed that the mismatched twin circuits were the same and the pairs of diodes 37, 42 and 38, 43 had equal peak currents. However, the tunnel diodes 37 and 42 may themselves have different peak currents as is shown in FIGURE 8 wherein tunnel diode 42 has a lower peak current than tunnel diode 37. Different threshold levels are thus defined for the mismatched twin circuits. Such an arrangement may be employed where the bipolar input signals are asymmetrical. Also, the tunnel diodes 38 and 43 may have different peak currents while still maintaining mismatch between the tunnel diodes of each mismatched twin circuit to achieve the same result.

In the above discussion, the effective biasing of one of the bistable circuit elements in each of the mismatched twin circuits was accomplished by providing tunnel diodes whose peak currents were different. This same effective biasing can be accomplished in other ways. For example, a mismatched twin circuit may be defined by a pair of identical tunnel diodes which are initially biased by a control or bias current supplied to the node between the tunnel diodes. Alternately, a biasing impedance may be connected in series or parallel with one of the tunnel diodes. Regardless of the biasing means employed, the arrangement is such that the node of the twin circuit assumes one polarity in the absence of input signals and the other polarity when an input signal of sufficient amplitude is applied.

In FIGURE 9 of the drawings, there is shown a circuit which is employed in certain applications for sensing input signals of one polarity. To avoid repetition in the specification primed reference numerals corresponding to the numerals used in connection with the circuit of FIGURE 1 are employed. One of the mismatched tunnel diode twin circuits has been replaced with a biasing input provided by terminal 108 which is always at the negative level. This circuit operates only on positive input signals supplied from the magnetic memory system and provides the desired output signals to the other logic circuitry of the digital data processor. In such a circuit, the tunnel diodes would be selected so that the operating point of tunnel diode 30' is adjacent the valley area in the presence of a positive input signal and the clock pulse voltages V*y* and —V*y*. The same result can be obtained by replacing twin circuit 52 with a twin circuit, not particularly shown, whose series connected tunnel diodes have different peak currents. The sense circuit would have the same terminal operation in that the node thereof would change polarities only when a positive gating and input signals were applied.

In certain instances it may be desirable to use the circuit of FIGURE 1 when sensing unipolar input signals. Current will not flow in the input circuit of this embodiment when no input signal of sufficient amplitude is present since the nodes 32 and 33 will be at the same potential level. However, in the arrangement shown in FIGURE 9 of the drawings, a current will flow in the input circuit under these conditions since one end of the sense winding 15' is referenced to ground. If the input circuit is highly reactive, such as the secondary winding of a coupling transformer or where an extremely large number of the magnetic cores 17' are used, the energy stored in the reactive load may generate a back signal which, when applied to the node 32', may cause the polarity of this node to change and possibly produce an erroneous output signal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sense circuit for sensing and providing an output signal indicating the presence and absence of bipolar input signals supplied from an input circuit including a magnetic memory system comprising:

a pair of input terminals for receiving input signals from said input circuit;

a pair of mismatched twin circuits;

each of said mismatched twin circuits having a pair of tunnel diodes connected in series between clock pulse terminals and a node between said tunnel diodes;

means connecting each node to one of said input terminals;

each of said tunnel diodes having a voltage-current characteristic having a peak value therein and being biased to provide a pair of stable operating states on opposite sides of said peak value;

one of said tunnel diodes of each of said twin circuits having a greater peak value than the peak value of the other of said tunnel diodes associated therewith;

means to apply inversely related clock pulses to said clock pulse terminals to cause said pair of tunnel diodes of each of said mismatched twin circuits to assume different states;

output means and means connecting each node to said output means;

each of said mismatched twin circuits having at least two stable states characterized by inversely related signals on the associated means connecting each node to said output means;

an input signal of one polarity having at least a preselected value applied to said input terminals causing one of said mismatched twin circuits to change states when said clock pulses are applied to produce signals of opposite polarity on said means connecting each node to said output means; and an input signal of the other polarity having at least a preselected value applied to said input terminals causing the other of said mismatched twin circuits to change states when said clock pulses are applied to produce signals of opposite polarity on said means connecting each node to said output means.

2. Apparatus according to claim 1 characterized by:

said output means comprising a pair of tunnel diodes connected in series between clock pulse terminals and having a node between said last mentioned tunnel diodes;

said last mentioned tunnel diodes having peak values which are approximately the same;

said means connecting leading to said last mentioned node;

an output terminal connected with said last mentioned node;

means for applying a gating signal to said last mentioned node;

means to apply clock pulses to said last mentioned clock pulse terminals which are sequential and overlapping with respect to said first mentioned clock pulses; and the polarity of the signal at said output terminal when said last mentioned clock pulses are applied corresponding to the polarity of the majority of the signals supplied to said last mentioned node.

3. Apparatus according to claim 1 characterized by:

said magnetic memory system comprising a sense winding; and said sense winding being directly connected to said input terminals.

4. Apparatus according to claim 1 comprising:

an impedance means connected in series relation with said input terminals and said nodes of said mismatched twin circuits; and said impedance means limiting current flow between said nodes through said input circuit after one of said mismatched twin circuits has changed state.

5. Apparatus according to claim 4 further characterized by:

said impedance means comprising a pair of tunnel diodes disposed in back-to-back relation; and one of said last mentioned tunnel diodes switching to a high impedance state after one of said mismatched twin circuits has changed state to effectively isolate said sense circuit from said input circuit.

6. A sense circuit for sensing and providing an output signal indicating the presence and absence of input signals from an input circuit comprising:

a pair of mismatched twin circuits;

each of said twin circuits comprising a pair of tunnel diodes connected in series with at least one clock pulse terminal and having a node between said tunnel diodes;

each of said tunnel diodes having a voltage-current characteristic having a peak value therein;

one of said tunnel diodes of each of said twin circuits having a greater value than the peak value of the other of said tunnel diodes associated therewith;

means to apply clock pulses to said clock pulse terminals sufficient to cause said tunnel diodes of each of said mismatched twin circuits to assume different states;

said nodes of said mismatched twin circuits being connected to said input circuit;

output means connected to said nodes of said mismatched twin circuits;

each of said mismatched twin circuits being capable of assuming at least two stable states characterized by inversely related signals at said nodes; and an input signal of one polarity having at least a preselected value causing one of said mismatched twin circuits to change state when said clock pulses are applied to produce signals of opposite polarity at said nodes.

7. Apparatus according to claim 6 characterized by:

at least one of said tunnel diodes of one of said mismatched twin circuits having a peak value which is different from the peak values of the tunnel diodes associated with the other of said mismatched twin circuits.

8. Apparatus according to claim 6 comprising:

at least one tunnel diode connected in series with said input circuit and said nodes; and said tunnel diode switching to a high impedance state to limit current flow between said noes through said input circuit after said one of said mismatched twin circuits has changed states.

9. Apparatus according to claim 8 characterized by:

said output means comprising a pair of similar tunnel diodes connected in series between clock pulse terminals and having a node therebetween;

said nodes of said mismatched twin circuits being connected with said last-mentioned node;

means to apply clock pulses to said last mentioned clock pulse terminals which occur in sequential and partially overlapping relation with respect to said first mentioned clock pulses; and said last mentioned node assuming a polarity corresponding to the majority of the inputs supplied thereto when said last mentioned clock pulses are applied.

10. A sense circuit for sensing and providing an output signal indicating the presence and absence of input signals from an input circuit comprising:

a pair of polystable stages;

each of said stages comprising a signal input means, a clock pulse input means and an output means;

each stage having at least two stable states respectively characterized by inversely relatived signals at said output means;

means connecting said signal input means to said input circuit;

means to apply clock pulses to said clock pulse input means;

both of said stages being in the same state in the absence of input sigals when said clock pulses are applied so that signals of the same polarity appear at said output means; and an input signal having at least a preselected value applied to said signal input means causing one of said stages to change state when said clock pulses are applied to produce signals of opposite polarity at said output means.

11. Apparatus according to claim 10 characterized by:

said input circuit comprising a magnetic memory system:

said magnetic memory system having a sense winding; and said sense winding being directly connected by said means connecting to said signal means.

12. Apparatus according to claim 10 characterized by:

impedance means connected in series relation with said signal input means and said input circuit;

said impedance means having a relatively low impedance state and a relatively high impedance state; and said impedance means switching to said high impedance state after one of said stages has changed state to effectively isolate said sense circuit from said input circuit.

13. Apparatus according to claim 10 characterized by:

a polystable output stage;

said output stage comprising signal input means connected with said output means of said pair of polystable stages, a clock pulse input means and an output means;

means to apply a gating signal to said signal input means of said output stage;

means to apply clock pulses to said clock pulse input means of said output stage which are sequential and overlapping with respect to said first mentioned clock pulses; and said output means of said output stage assuming a polarity according to the majority of the signals supplied to said input means thereof when said last mentioned clock pulses are applied.

14. A sense circuit for sensing and providing output signals indicating the presence and absence of input signals from an input circuit comprising:

a polystable stage;

said polystable stage comprising a pair of bistable devices each having a low impedance and a high impedance state;

said bistable devices being connected in series with clock pulse means and having a node therebetween;

means connecting said node to said input circuit;

means to apply clock pulses to said clock pulse means;

output means connected with said node;

said bistable devices of said stage assuming opposite states in the absence of input signals when said clock pulses are applied to produce a signal of one polarity at said output means, and an input signal of a preselected value occurring when said clock pulses are applied causing said bistable devices to assume opposite states with respect to each other and with respect to the time when only clock pulses are applied to produce a signal of the other polarity at said output means.

15. Apparatus according to claim 14 characterized by:

said means connecting said node to said input circuit comprising an impedance means;

said impedance means having a relatively low impedance state and a relatively high impedance state; and said impedance means switching to said high impedance state after the simultaneous occurrence of both said input signal and clock pulses to effectively isolate said sense circuit from said input circuit.

16. Apparatus according to claim 14 characterized by:

said bistable devices each having a characteristic with a peak value therein and the impedance states thereof being disposed on opposite sides of said peak value;

said bistable devices having different peak values; and said clock pulses causing the operating point of only one of said bistable devices to rise to said peak value and switch states in the absence of input signals.

17. A sense circuit for sensing and providing output signals indicating the presence and absence of input signals supplied from a first system operating at a first rate to a second system operating at a second rate comprising:

first and second polystable stages;

each of said stages comprising a signal input means, a clock pulse input means and an output means;

each stage having at least two stable states respectively characterized by inversely related signals at said output means;

means connecting said signal input means to said input circuit;

means to apply clock pulses occurring at a rate equal to said second rate to said clock pulse input means;

both of said stages being in the same state in the absence of input signals when said clock pulses are applied so that signals of the same polarity appear at said output means;

an input signal having at least a preselected value applied to said signal input means causing one of said stages to change state when said clock pulses are applied to produce signals of opposite polarity at said output means;

a third polystable stage comprising a signal input means, a clock pulse input means and an output means;

said third stage having at least two stable states characterized by inversely related signals at said output means and corresponding to the majority of the input signals applied to said signal input means thereof;

said output means of said first and second stages being connected to said signal input means of said third stage;

means to apply clock pulses occurring at a rate equal to said second rate which are sequential and overlapping with respect to said first mentioned clock pulses to said clock pulse input means of said third stage;

means to apply a gating signal to said signal input means of said third stage;

said gating signal occurring at a rate equal to said second rate; and said gating signal changing its polarity at times corresponding to said first rate to cause a change in the polarity in the signal at said output means of said third stage when an input signal having at least a preselected value is present.

18. A sense circuit for sensing and providing output signals indicating the presence and absence of input signals from an input circuit comprising:

first and second polystable stages;

each of said stages comprising a pair of bistable devices connected in series and having a node therebetween;

means connecting each of the nodes to said input circuit;

output means connected with said nodes;

each of said stages having at least two stable states characterized by inversely related signals at the node thereof;

both of said stages being in the same state in the absence of input signals so that signals of the same polarity are supplied to said output means; and an input signal having at least a preselected value causing one of said stages to change state to provide signals of opposite polarity to said output means.

No references cited.